United States Patent Office 3,110,487
Patented Nov. 12, 1963

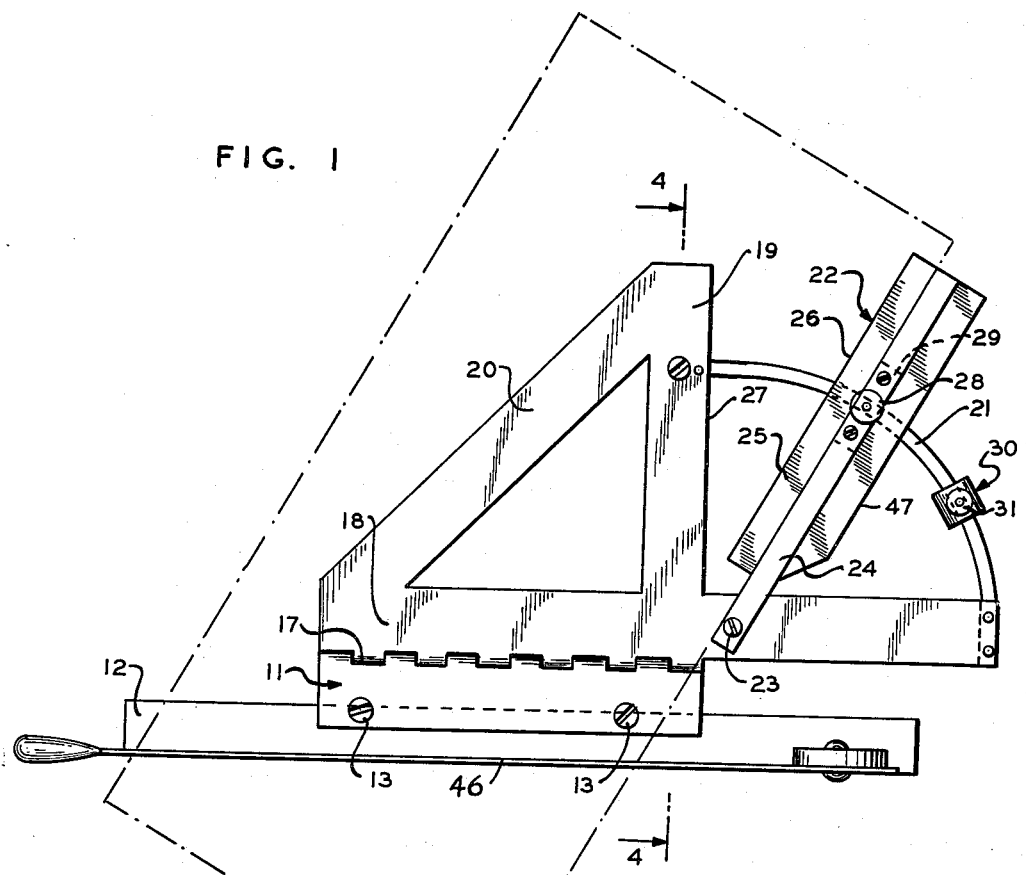

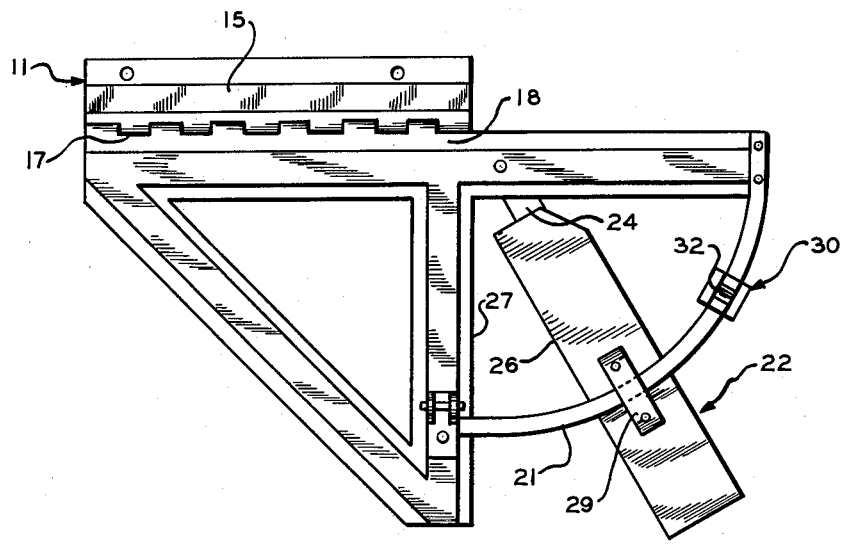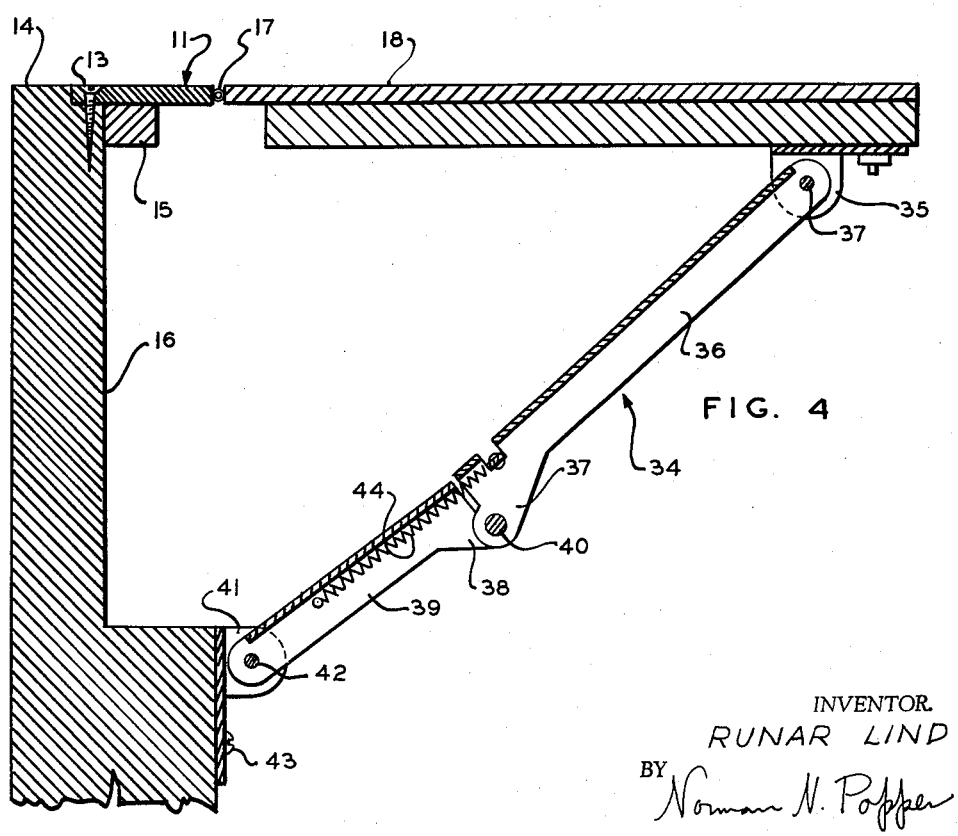

3,110,487
CUTTER WORK GUIDE
Runar Lind, 199 New Jersey Ave., Bergenfield, N.J.
Filed June 6, 1962, Ser. No. 200,546
6 Claims. (Cl. 269—303)

My invention relates to cutter work guides generally and specifically to a foldable cutter work guide provided with a pivotal member adapted to position shingles for cutting by a pivotal blade.

Asbestos shingles employed for roofing or siding are usually cut by a single blade pivotal at one end. Frequently, it is necessary to cut the shingles at a predetermined angle and, therefore, it is useful to provide a guide secured to the cutter which will position shingles in a plurality of predetermined angles for cutting and which can be folded downwardly out of the way when not in use.

Therefore, it is among the objects and advantages of my invention to provide a cutter work guide which is provided with an adjustable pivotal guide arm adapted to position the shingle in a plurality of predetermined angles relative to the blade of the cutter.

Another object of my invention is to provide a cutter work guide which is hingedly secured to the cutter table and is adapted to fold downwardly when not in use.

A further object of my invention is to provide a cutter work guide having an adjustable stop to preserve the setting of a given angle on the pivotal shingle guide arm.

These objects and advantages as well as other objects and advantages may be achieved by my invention, one embodiment of which is illustrated in the drawings in which:

FIGURE 1 is a top plan view of my cutter work guide attached to a cutter table and showing a shingle positioned thereon in broken lines.

FIGURE 2 is a side elevational view of my cutter work guide extended by means of a foldable leg to a horizontal position for use.

FIGURE 3 is a bottom plan view of my cutter work guide.

FIGURE 4 is a side elevational view of my cutter work guide looking in the direction opposite that shown in FIGURE 2.

Referring now to the drawings in detail, my cutter work guide comprises a generally T-shaped mounting member 11 which is secured to a cutter table 12 by means of a pair of screws 13, 13. The top 14 of the table 12 is recessed to accommodate the mounting member 11. The vertical leg 15 of the mounting member 11 abuts the side 16 of the table 12.

The longitudinal side edge of the mounting member 11 opposite the table 12 is provided with a piano hinge 17. A flat, generally rectangular platform member 18 is engaged to the opposite side of the hinge 17. Formed perpendicularly on the longitudinal platform member 18 and lying in the same plane thereof, is a generally flat platform member 19. A flat diagonal platform member 20 is mounted between the longitudinal platform members 18 and 19 and lies in the same plane thereof. A 90° arcuate rail 21 is secured between the bottom of the member 19 and the bottom end of the longitudinal platform member 18. The rail lies in a plane generally parallel to and beneath the plane of the platform members 18, 19 and 20.

A pivotal guide arm 22 is pivotally mounted on the longitudinal platform member 18 by means of a pin 23. The pivotal guide arm 22 comprises a central rib 24 through which pin 23 passes and a generally flat base 25 formed integrally at the bottom of the rib 24 and lying generally in the plane of the platform members 18, 19 and 20. The rib 24 is pivotally mounted to the platform member 18 in such a position that the longitudinal side edge 26 of the base 25 will lie flush with the longitudinal edge 27 of the arm 19 when the rib 24 is perpendicular to the longitudinal axis of the platform member 18 and to the hinge 17.

The guide arm 22 is provided with a set-screw 28 which is threadably engaged to the rib 24 passing perpendicularly therethrough to engage the rail 21. A generally U-shaped guide 29 is mounted on the bottom of the guide arm 22 loosely enclosing the rail 21. In addition, a movable stop 30 is engaged to the rail 21 by means of a threaded nut 31 passing therethrough to engage the rail. The stop 30 comprises a generally U-shaped member 32 which rests on the top of the rail 21 with its legs extending downwardly beneath the rail. A cross member 33 is engaged across the legs of the U-shaped member 32 beneath the rail 21. By turning the set-screw 31 downwardly to engage the rail from the top, the U-shaped member is drawn upwardly until the cross member 33 tightly engages the rail 21 from the bottom thereby retaining the stop 30 in position.

A spring loaded foldable leg 34 is pivotally mounted to the bottom of the member 19. A pair of downwardly extending ears 35 are formed on the bottom of the member 19 and a leg 36 is pivotally mounted therebetween by means of a pin 37. The opposite end of the leg 36 is provided with a pair of downwardly extending ears 37 which are pivotally secured to an opposing pair of ears 38 on a second leg 39 by means of a pin 40. The second leg 39 is pivotally mounted between a pair of ears 41 secured to the side 16 of the table 12 by means of a screw 43. The legs 36 and 39 are generally U-shaped with the open portion facing downwardly. A spring 44 is engaged between legs 39 and 36 and resists folding of the legs 36 and 39 when the legs abut end to end in a straight line. The legs 36 and 39 may be folded upwardly, pivoting about pins 37, 40 and 42 respectively, against the urging of the spring 44 until the spring 44 passes beneath the pin 40. The spring 44 then pulls the legs 36 and 39 together to assume a folded position. As the legs 36 and 39 pivot upwardly, the member 19 pivots downwardly rotating the platform member 18 about the piano hinge 17. The platform members 18, 19 and 20 will lie parallel to the table 12 when the leg 34 is fully folded. It should be noted that the pin 42 should lie on a line perpendicular to the hinge 17 in order to permit the guide to fold downwardly to a portion parallel to the table 12.

In operation, the leg 34 is unfolded causing the platform members 18, 19 and 20 to rotate upwardly on hinge 17 to a horizontal position. When in a horizontal position, the leg 34 is locked against folding by the urging of the spring 44. The turn nut 28 on the guide 22 is loosened and the guide rotated about pivot point 23 and guided and supported by the rail 21. When the desired angle has been achieved, the nut 28 is tightened to secure the guide 22 against rotation. A shingle 45 is then placed over the platform members 18, 19 and 20, and mounting member 11 which lie in the same plane, with one side firmly engaged to the side of the rib 24. The shingle 45 extends beneath the blade 46 of the cutter. In this fashion, the angle of cut may be precisely determined and the shingle guided to achieve the angle.

The stop 30 may be moved by loosening the nut 31 and moved on the rail 21 to engage the opposite side 47 of the base 25 of the guide 22. Thus, the position of the guide 22 may be changed at will with the previous angular position preserved by the stop 30.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

What is claimed:
1. A cutter work guide comprising,
    (a) a mounting member,
    (b) a platform member hingedly secured to the mounting member,
    (c) a guide arm pivotally mounted to the platform member,
    (d) means adapted to engage the guide arm to secure it against movement, and
    (e) collapsible means adapted to support the platform member and guide arm when extended.
2. A cutter work guide comprising,
    (a) a mounting member,
    (b) a first platform member hingedly secured to the mounting member,
    (c) a second platform member formed on the first platform member perpendicular to the hinge,
    (d) an arcuate rail mounted between the first and second platform members,
    (e) a guide arm pivotally mounted to the first platform member and slidably engaged to the arcuate rail, the guide arm adapted to engage the second platform member,
    (f) means adapted to engage the guide arm to secure it against movement, and
    (g) collapsible means adapted to support the platform members when said means are extended.
3. A cutter work guide comprising,
    (a) a flat, generally rectangular mounting member adapted to be secured to the top of a cutter table in a horizontal position,
    (b) a flat, generally rectangular first platform member hingedly secured to the mounting member,
    (c) a flat, generally rectangular second platform member formed on the first platform member and lying in the plane of the first platform member,
    (d) an arcuate rail mounted between one end of the first platform member and the end of the second platform member opposite the hinge,
    (e) a guide arm pivotally mounted to the first platform member and slidably engaged to the rail, the guide arm adapted to engage the second platform member,
    (f) means adapted to engage the guide arm to secure it against movement.
    (g) collapsible means having one end pivotally mounted to the bottom of the second platform member, the opposite end adapted to be pivotally mounted to the side of the cutter table, the said collapsible means adapted to support the first and second platform members in a horizontal position when extended.
4. A cutter work guide comprising,
    (a) the structure in accordance with claim 3 and an adjustable stop slidably mounted on the rail and adapted to prevent movement of the guide arm beyond a predetermined point.
5. A cutter work guide comprising,
    (a) the structure in accordance with claim 3 and
    (b) a flat, third platform member mounted between the end of the first platform member opposite the rail and the end of the second platform member opposite the hinge, the third platform member lying in the plane of the first and second platform members.
6. A cutter work guide comprising,
    (a) the structure in accordance with claim 3 in which the hinge is mounted on the side edge of the mounting member and the side edge of the first platform member so that the platform members can be disposed in the same plane as the mounting member.

References Cited in the file of this patent
UNITED STATES PATENTS

| | | |
|---|---|---|
| 413,522 | Kelsey et al. | Oct. 22, 1889 |
| 1,918,104 | Hook | July 11, 1933 |
| 2,887,017 | Lossy | May 19, 1959 |